June 4, 1963   D. LABINO   3,092,531
PROCESS OF MAKING ESSENTIALLY PURE SILICA FIBER BATS
Original Filed May 6, 1953   2 Sheets-Sheet 1
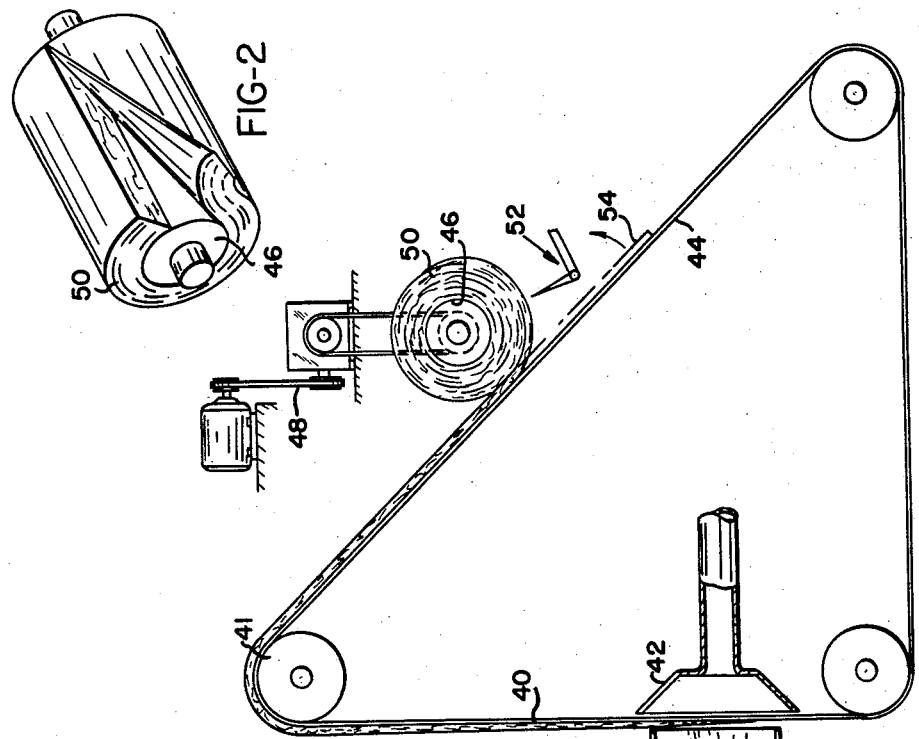
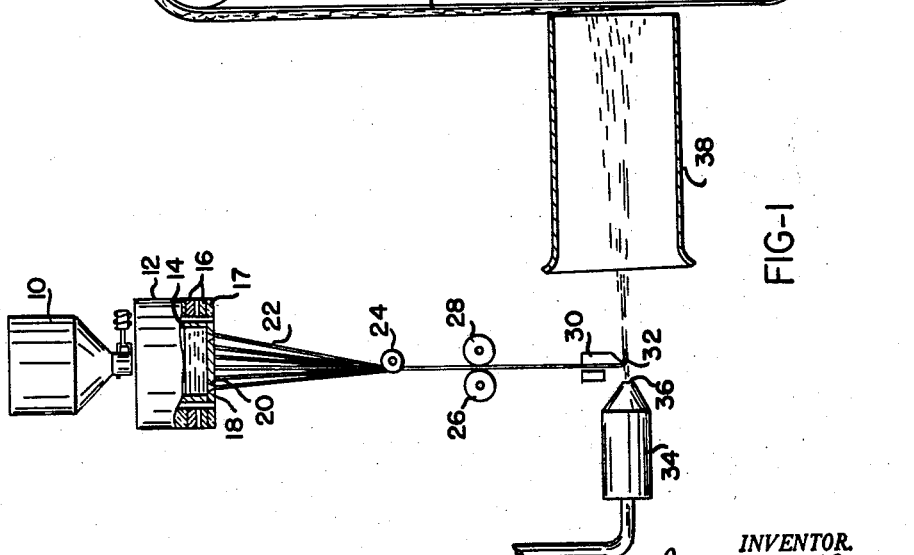
INVENTOR.
Dominick Labino
BY Nobbe & Swope
ATTORNEYS June 4, 1963 D. LABINO 3,092,531
PROCESS OF MAKING ESSENTIALLY PURE SILICA FIBER BATS
Original Filed May 6, 1953 2 Sheets-Sheet 2
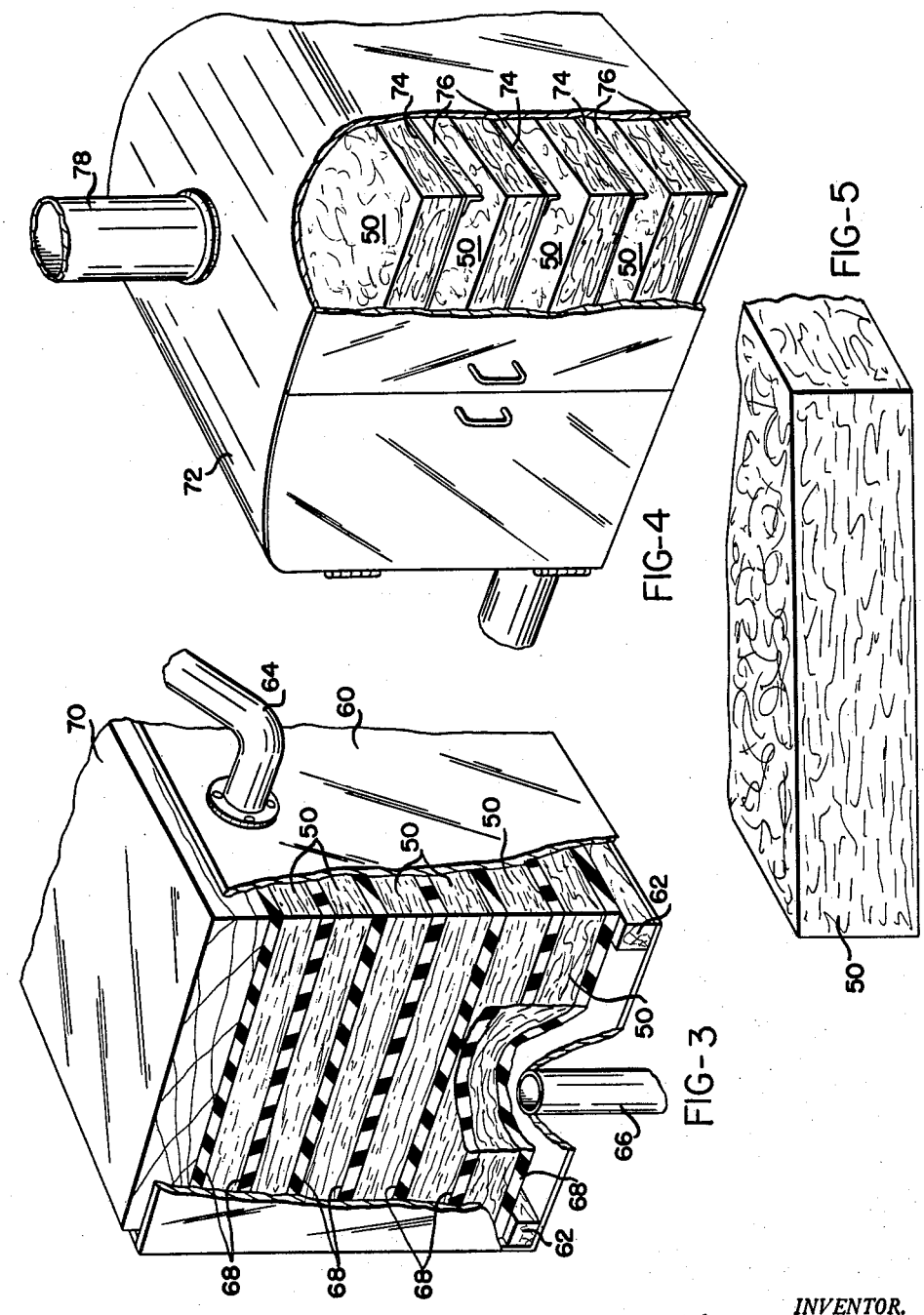
INVENTOR.
Dominick Labino
BY Nobbe & Swope
ATTORNEYS

United States Patent Office 3,092,531
Patented June 4, 1963

3,092,531
PROCESS OF MAKING ESSENTIALLY PURE
SILICA FIBER BATS
Dominick Labino, Maumee, Ohio, assignor, by mesne assignments, to Johns-Manville Fiber Glass Inc., Cleveland, Ohio, a corporation of Delaware
Continuation of application Ser. No. 353,348, May 6, 1953. This application Feb. 1, 1956, Ser. No. 562,722
2 Claims. (Cl. 156—24)

This invention relates to the production of fibers of silica for use in industrial applications which require a material of superior tensile strength and high insulation qualities.

This application is a continuation of my copending application Serial No. 353,348, filed May 6, 1953, now abandoned, which in turn is a continuation-in-part of my now abandoned application Serial No. 304,150, filed August 13, 1952.

In my co-pending application there is described a fiber which consists essentially of and which exhibits the properties of substantially pure silica. As described in that application the silica fiber is produced by first forming a fiber of soluble sodium silicate and then leaching sodium oxide from the sodium silicate to attain the silica in fiber form.

It is within the contemplation of this invention to provide a product which consists essentially of silica fibers and which has superior strength properties. This objective is attained, generally speaking, by forming a compact bat of blown fibers of an alkali silicate and then leaching the alkali therefrom while maintaining the fibers in bat form. Quite surprisingly the compacting of the fibers and the subsequent leaching in the compact form does not cause a physical deterioration of the fibers, but the bat, on the contrary, exhibits essentially good strength properties, rendering it suitable for many uses where more fragile bats of fibers would be destroyed.

Preferably in the process of invention the fibers of alkali silica are wound into a tight compact bat as they are produced, the individual fibers interlacing to form a unitary mass. Then preferably a series of these masses is arranged in tiers and while so arranged the alkali is leached from the compacted fibers. During the leaching the masses are preferably maintained under a slight pressure, sufficient to prevent swelling of the fibers upon passage of the leaching agent therethrough. This insures that the resultant bat will have an optimum strength condition.

The leaching agent may be water or an acid which does not attack the silica fiber produced by the leaching; that is phosphoric acid is not considered suitable although organic acids as well as inorganic acids may be employed.

The leaching operation may be performed with water at room temperature over a period of about 10 hours, or it may be performed with water at the boiling point in a lesser time. Where acid is employed a time of about 1 hour for the extraction of the oxide may be achieved if the acid is at a high temperature, for instance 212° F. More specifically, the conditions are substantially those set out in my co-pending application referred to hereinbefore.

This leaching operation not only removes the alkali and oxide but it also occasions the pickup of water molecules by the silica and the immediate product of the leaching operation is a hydrated silica or a silica containing chemically combined water. These chemically combined water molecules are not removed when the mass of fibers is subjected to drying conditions at about 212° F. but are driven off when the temperature of the plied mass is raised above 1000° F., and to attain pure silica product it is necessary to employ in the process of invention a temperature of about 1000° F.

While I prefer to employ fibers of the alkali silicate which have diameters of about 1 micron or less, I have found fibers having a diameter up to about 2½ microns respond exceedingly well to the process and may be employed to produce the substantially pure silica fibers in bat form which constitute the product of this invention.

It is also to be noted in this connection that while it becomes more difficult to remove the alkali compound as the fiber size increases, in many applications the presence of a small amount of alkali is not objectionable, although such fibers it is to be stressed do not exhibit the optimum properties obtainable with the fibers which consist essentially of silica.

Glasses found to be most suitable for attaining the strong silica bats are alkali glasses having a weight ratio of alkali oxide to silica in the approximate ratio of about 1:4; such glasses soften at relatively low temperatures and accordingly may be readily fused and drawn into long thin strands which upon being subjected to a hot gas blast are blown into fibers having a diameter, depending upon specific conditions, of 2½ microns or less; preferably the conditions are such that the glass fibers formed are 1 micron or less in diameter, as this facilitates the subsequent alkali-oxide extraction.

The fibers which are blown from the alkali glass are collected on a moving belt and they appear as a white fluffy fibrous mat. In the process of this invention the thus collected fibers are plied together to form a thick bat, and the plying operation is preferably performed by passing the blown fiber as it is formed about a moving roll until the desired thickness of bat is attained. This operation causes the fibers and adjacent layers to interlace and to become compressed together; upon attaining of the required thickness the bat is cut from the roll and leached free from the alkali and generally, for economic reasons, it is preferable that the series of bats, to which a slight pressure is applied, are extracted at one time.

It is to be noted in this latter connection that it has heretofore, that is prior to my co-pending application, been considered to be substantially impossible to leach glass fibers free of alkali without causing a destructive deterioration of the fibers; in fact, in thin structural form alkali glasses containing only the alkali and silica have been considered unsuitable for most purposes due to the destructive action of the alkali on the silica, particularly in the presence of moisture, the destructive action occurring to such an extent that the thin structure disintegrates. Further it has been considered that fibers in this form would fragment readily and could not be suitably employed for the production of useful articles. However I have found that if the alkali oxide is removed from the glass in accordance with the teachings of my co-pending application that such deteriorating action does not occur and that the fibers of the alkali silicate during the leaching process require no external support or protection whatever; further I have found quite unexpectedly that it is possible to leach bats having a considerable thickness completely free of the alkali while attaining a bat of relatively high strength as a result of the process and that this may be accomplished without binding the fibers of the bat individually or as a mass.

After the leaching of the bat the fibers thereof will, as noted hereinbefore, contain the water molecules which are apparently chemically combined with the silica. The bat in this condition will have a slightly soapy feeling when dried at about 212° F. However when subjected to a temperature in excess of about 1000° F. the chemically combined water is expelled and the resultant product is a white spongy mass in which the individual fibers are substantially indistinguishable; the interior of this product when exposed, as by tearing, very much resembles a mass of cotton batting, as the fibers are substantially opaque and do not at all resemble the filaments from which the fibers are derived. More specifically the product does not have an open fiber appearance, but is a soft coherent mass in which the individual fibers are substantially indistinguishable. These characteristics are attained because of the close cohesion of the fibers and their contact with each other during the production process.

The invention will be more fully understood by reference to the following detailed description, including a specific example, and the accompanying drawings wherein:

FIGURE 1 is a schematic representation of apparatus used in the formation of the compact layered bats;

FIGURE 2 illustrates a bat of fibers in a portion of the apparatus of FIGURE 1;

FIGURE 3 illustrates equipment for effecting a leaching operation;

FIGURE 4 schematically illustrates an oven for the heating of the product in a production manner; and FIGURE 5 is a view in section illustrating the product of invention.

Referring briefly to FIGURE 1 there is shown generally therein apparatus useful in the attainment of the attenuated fibers of alkali silicate necessary for the purposes of this invention. This apparatus is described completely in my co-pending application, Serial No. 247,010, filed September 17, 1951, and assigned to the same assignee as the present invention, and is referred to herein in order that the invention may be readily understood.

As illustrated in FIGURE 1 a hopper 10 may feed small glass balls of about ½ inch diameter to a chamber 12, lined with platinum as at 14 and heated uniformly by coil 16. Coil 16 is positioned over only a lower portion of the periphery where glass fusion takes place and heat insulating ceramic material 17 surrounds the remainder of the periphery for conservation of heat and maintenance of uniform temperature. The bottom wall 18 of this chamber is provided with small openings 20 through which glass may exude in the form of strands.

Strands as at 22 emanating from chamber 12 pass over guide roller 24 between drawing rolls 26, 28 to guide block 30 having a U-shaped edge 32. In horizontal alignment with edge 32 is positioned gas burner 34 having a horizontal discharge slot 36 through which a high velocity high temperature gas blast is discharged to sweep the ends of glass fibers 22 extending below edge 32 into chamber 38. A belt 40 traveling vertically past the far end of chamber 38 receives the fibers thereon. The belt 40 is driven at a slow speed preferably about 10 feet per minute by apparatus (not shown). A hood 42 to which a vacuum source (not shown) is applied assists the flow of the fine fibers from the chamber 38 to the belt.

A suitable composition of the glass of the balls for this fiber formation is about 78.2% silica and 21.8% sodium oxide.

Positioned closely adjacent the outer run 44 of the belt is a steel roller 46 driven by a motor and gear box unit 48 at approximately the same surface speed in feet per minute as the belt 40. The fluffy fibers deposited in a mat form on the belt at 39 and passing upwardly over the pulley 41 are in their downward course on the outer run 44 wrapped around the roller 46 to form a tightly plied bat of sodium silicate fibers 50. The thickness of the fluffy fibers as they pass upwardly at 39 is about ⅟₁₆ of an inch and the thickness of the mass on the roller 46 may be preferably about 1¼ inches for general commercial purposes, that is the material is plied about 20 times.

It is to be noted that the thin mat at 39 may be tensioned slightly as it is drawn onto the roller 46 the outer plies of the layered bat due to the increased surface speed at the larger diameter being more tightly wound which is desirable to increase the compactness. If preferred, an automatic control may be employed to maintain the mat speed constant by varying the roller r.p.m. and may be necessary if extremely thick bats are to be produced.

When the plied product has been attained the strand of the fibers moving down the run 44 is cut at just adjacent the roller, the mass 50 being preferably sliced completely therethrough (FIGURE 2) in one operation by knife blade indicated generally at 52.

During the cutting operation the belt 40 may continue to run and the disconnected fibrous mass will pass downwardly as indicated in dotted lines at 54 and this material may then be wrapped upwardly around the roller 46 from which the first mass 50 has been cut in order to start the next cycle.

When a series of masses has been attained (FIGURE 3) and flattened out they are ready for the leaching operation which is performed in a heavy wooden box 60 provided with supports 62 and inlet 64 and an outlet 66. Adjacent the supports 62 there is first placed a layer of acid-resistant saran 68 and the first layer of fibers 50 is placed thereon; alternately layers of saran and fibers then fill the wooden box to substantially the top thereof. The uppermost layer of saran receives thereon a relatively light weight wooden cap 70; the weight of this cap 70 is sufficient to prevent swelling of the fibers of the mass 50 when acid is passed into the box 60, but does not place a positive pressure on the bats in the sense they are squeezed together thereby; rather the cap where used floats upon the body of glass bats subjected to the leaching agent. Thus in the process of invention the mats 50 stripped from the roller 46 in their tiered arrangement of the box 60 may be subjected to a continuous flow of an acid solution containing about 5 percent by weight of sulfuric acid at a temperature of about 180° F.

With the acid penetrating continuously through the box the sodium oxide present in the sodium silicate fibers will be leached completely from the fibers in about 2 hours.

After completion of the acid treatment water may be passed through the inlet 64 to the outlet 66 to free the fibers of excess acid. Thereafter the light weight cap 70, the saran layers and the fiber layers are removed from the box 60 and if necessary further washed in water to insure the complete freedom of the same from acid.

Referring now to FIGURE 4 there is shown an oven 72 in which the bats of silica fibers 50 may be stacked between spaced plates 74 supported in the oven on channels as at 76 for subjection to a temperature of about 1100° F. to 1200° F. The water vapor is drawn off from the product through the outlet 78 and the heating is effected for approximately 3 hours in order to insure of complete removal of the combined water.

The product of this heating operation as indicated in FIGURE 5 is the white fluffy coherent mass described hereinbefore.

In connection with the process of invention generally it is to be noted that it is not necessary to use an acid, but the leaching may be effected by flowing water at room temperature through the fibers positioned in the box 60 for a period of about 10 hours.

The percolation of the water through the box apparently inhibits any tendency of the material to gel. Where higher temperatures are used and water is percolated through the material the time of leaching may be shortened by raising the temperature of the water, for example, water at about the boiling point effects complete leaching by a third the time required at room temperature.

Where water is employed it is preferable to utilize distilled water in order to avoid the introduction of any impurity into the mass as will be understood by one skilled in the art. However in many localities tap water is entirely suitable, and when the leaching or extraction agent contains a mineral acid tap waters are generally suitable for the process.

High acid concentrations may also be suitably employed, 5 to 20 percent by weight of the mineral acids, i.e., HCl or $H_2SO_4$ being entirely suitable; organic acids may be similarly utilized.

The acids may be at temperatures of up to the boiling point, but some are difficult to handle under this condition requiring special equipment to prevent corrosion failures and excessive volatilization and therefore lower temperatures are in general preferred, sulfuric acid at temperatures of up to 180° F. being very suitable.

In this latter connection it is to be noted that the acids used preferably form a soluble salt with the material leached from the fibers as such may be readily removed from the silica product by simply washing the same.

The rate of flow of the leaching acid or water is not critical it generally being satisfactory for production purposes to simply continuously percolate the leaching agent. If desired a batch process may be employed for leaching but in this case it is desirable to change the leaching agent at frequent intervals in order to avoid any tendency towards gel formation; thus if water is used at room temperature the water should be changed every 1–2 hours in the 10–12 hour treatment for the alkaline oxide removal.

The monovalent alkalis are preferable for the practice of invention, sodium being preferred, but potassium, lithium and mixtures of the alkalis such as a sodium-potassium silicate being suitable. The ratio of silica to alkaline oxide should be relatively high as the resultant product having only a small amount of material leached therefrom will have a considerable body; a silica to alkaline oxide ratio of about 4:1 is entirely suitable for production purposes from the point of view of body in the silica fiber.

Repeated experiments have demonstrated that 100% of the alkaline oxide which is in the original glass composition is removed in the practice of the invention, and accordingly the product of the specific example set out hereinbefore is substantially 100% silica.

The existence of an impurity in the finished product which does not materially affect the capabilities of the silica of the fiber may, for many purposes, be tolerated. However 1% of alkaline oxide, as for example, 1% by weight of $Na_2O$ in the product lowers the fusion point and electrical resistance materially.

The presence in the silica of traces of oxides may in many instances be tolerated but it is to be clearly understood that the invention involves an alkali glass, i.e. an alkali silicate system from which the alkali may be completely removed; the presence of very small amounts of iron, aluminum, calcium, magnesium and other such oxides which may be present as impurities in the sand utilized for glass forming may in most instances be tolerated however, it being important to keep such quantities low, as less than 2% total, in order that the fiber produced upon leaching will be self sustaining. Thus where the original glass contains 78% silica, 21.8% $Na_2O$ and .2% of other oxides over 78% of the original fibers remain after leaching and accordingly the body of fibers is self-supporting. This latter factor is considered to be important with respect to the ability of the fibers to withstand, in compacted bat form, without exterior support, the handling and other processes involved in the inventive method.

With regard to production arrangements it is to be noted that the alkali silicate fiber should be leached within a reasonable time after formation thereof or the fiber stored under such conditons that self-deterioration will not occur. Thus the fibers should not be left for an undue length of time in a humid atmosphere. A time of storage of less than two days under normal weather conditions is generally satisfactory although the process is preferably practiced as a continuous one.

The product of the invention is a strong material suitable for use at high temperatures as in the tail pipes of jet aircraft; the product also has particular value in fire-entry suits and may of course be used in all places where fibrous glass is normally utilized and will provide superior strength in those environments.

It will be understood that this invention is susceptible to modification in order to adopt it to different usages and conditions and accordingly, it is desired to comprehend such modifications within this invention as may fall within the scope of the appended claims.

I claim:

1. A process for producing a fibrous bat of substantially pure silica, comprising forming a compacted bat of siliceous fibers consisting essentially of silica and an alkali metal oxide, the ratio of silica to said alkali metal oxide being in the order of about 4:1 and said fibers having a diameter less than 2½ microns, and flowing an aqueous leaching solution through said bat of fibers until substantially all of the alkali is extracted therefrom.

2. A process as defined in claim 1, wherein the leaching solution contains an acid which will form a water soluble salt with the alkali, and after substantially all of the alkali has been extracted from the fibers flowing water through the fibers to wash the salt from the fibers.

References Cited in the file of this patent

UNITED STATES PATENTS

| | | |
|---|---|---|
| 2,165,280 | Lannan | July 11, 1939 |
| 2,461,841 | Nordberg | Feb. 15, 1949 |
| 2,494,259 | Nordberg | Jan. 10, 1950 |
| 2,692,220 | Labino | Oct. 19, 1954 |